Aug. 27, 1935.    F. M. CLARK ET AL    2,012,302
HALOGENATED MATERIAL AND PROCESS OF PREPARING THE SAME
Filed April 4, 1933

DEVICES ILLUSTRATED CONTAIN
HALOGENATED POLYPHENYL METHANE.

Inventors:
Frank M. Clark,
Walter M. Kutz,
by *Charles E. T. Miller*
Their Attorney.

Patented Aug. 27, 1935

2,012,302

UNITED STATES PATENT OFFICE 2,012,302

HALOGENATED MATERIAL AND PROCESS OF PREPARING THE SAME

Frank M. Clark and Walter M. Kutz, Pittsfield, Mass., assignors to General Electric Company, a corporation of New York Application April 4, 1933, Serial No. 664,361

16 Claims. (Cl. 260—64)

The present invention comprises new industrially useful halogenated hydrocarbon compounds some being liquid and others being solid at ordinary temperatures, but all being non-crystalline in character.

The compounds embodying our invention may be used for various purposes, for example, as dielectric media in electrical devices; as heat transfer media and as lubricants. In some applications more than one function may be utilized, as, for example, when a liquid embodying our invention is employed as a dielectric and cooling medium in a transformer.

Our invention includes compositions which chemically may all be said to be compounds in which phenyl groups are linked together by carbon. Our invention includes compositions in which two or more phenyl radicles are substituted for hydrogens in an alkyl compound, such as methane,

Our invention also includes compounds in which phenyl groups are linked together through the carbon of a ketone group. Compositions embodying our invention may contain different amounts of halogen.

In general as a consequence of our invention we have produced new chemically stable compositions having new and useful properties, some of these compositions being non-inflammable in the ordinary sense and others being not only non-inflammable but also producing only non-inflammable gas when decomposed by an electric arc, or other agency.

Mineral hydrocarbon oils and asphaltic materials which have been commonly used for dielectric, heat transfer and lubricating purposes are inflammable and are subject to the evolution of combustible gas when an electric arc comes into direct contact therewith.

A disadvantage accompanying the use of mineral oil as dielectric material for electric apparatus is the formation of sludge. Sludge is a semi-solid material comprising oxidation and polymerization products. It prevents the circulation of the cooling medium and hastens electrical breakdown.

Our various new liquid and solid halogenated polyphenyl compositions may be prepared in forms free from these disadvantages and hence are particularly well adapted for dielectric uses, either by themselves or compounded with other dielectric materials.

The novel features of our invention, including such new products, the method of preparing the same, and electric device containing the same, will be pointed out with greater particularity in the appended claims.

Figure 1:
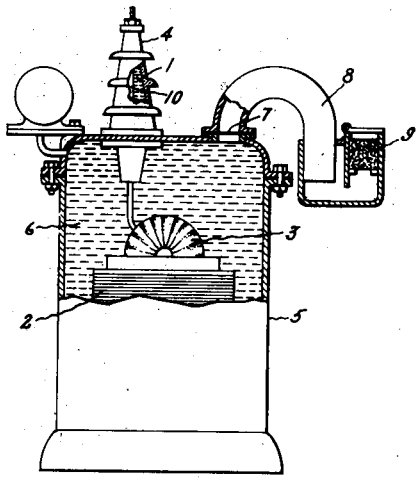
Figure 2:
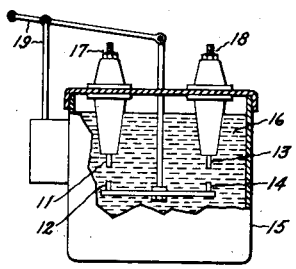
Figure 3:
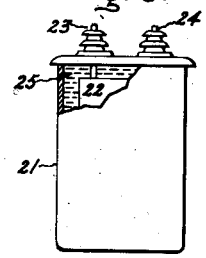
Figure 4:
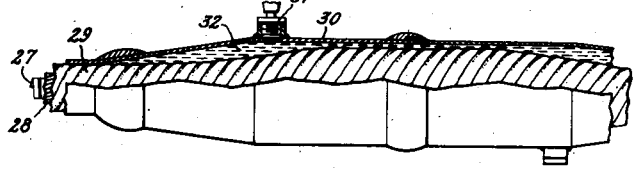
Figure 5:
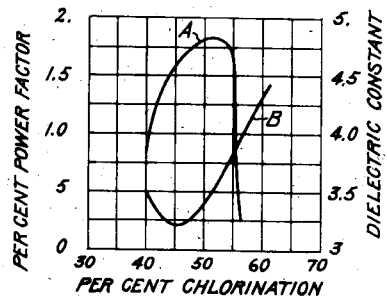

In the accompanying drawing Fig. 1 shows conventionally an electric transformer; Fig. 2 an electric switch or circuit breaker; Fig. 3 an electric capacitor; Fig. 4 a cable section as representative of some forms of electrical apparatus in which compositions embodying our invention may be used as dielectric media; and Fig. 5 is a graph showing the relation of electrical properties to halogen content over a given range of one of the compositions embodying our invention.

Our invention is not limited in its scope to any particular phenyl methane derivative or to any particular halogen. Its nature and scope will be illustrated in connection with the preparation of various polyphenyl derivatives of methane which contain chlorine in their molecular structure. Other halogens, such for example as iodine, bromine, or fluorine, may be employed without departing from the spirit of our invention.

It will be understood by those skilled in this art that the examples herein set forth are not chemically pure compounds. As indicated by their widely ranging boiling points, the various compositions or mixtures although consisting chiefly of one particular derivative of chlorinated polyphenyl methane (which may be present as isomers) may also contain other chlorinated compounds, such for example as various other derivatives of chlorinated polyphenyl methane having a different chlorine content. The compositions herein have been given the name of the compound of which they are chiefly composed.

Various compositions embodying our invention to be described hereinafter are prepared in accordance with a chemical reaction which in its general chemical aspect is known as the Friedel-Craft reaction, two chemical products being caused to be linked or condensed to produce new products in the presence of aluminum chloride. One of the reacting products may consist for example of benzyl chloride (or of a substituted benzyl chloride) and the other reacting product may consist of benzene (or of a substituted benzene). In a simple form a reaction for preparing one of the products of our invention may be represented graphically as follows, the reacting materials being monochlor benzyl chloride and monochlor benzene.

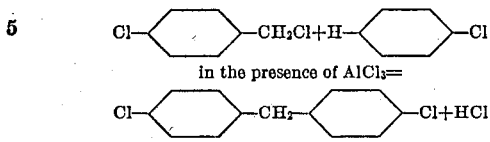

The reaction, however, is not believed to be necessarily as simple as here indicated. Further condensation and interaction may occur. We prefer to employ in most cases a molecular excess of the product which is condensed with the benzyl derivative,—for example, an excess of benzene. The product will not be the same if such excess is not used.

The introduction of chlorine in the side chain in the preparation of benzyl chloride may be accomplished by the direct chlorination of boiling toluene, $C_6H_5.CH_3$.

If the toluene is chlorinated in the presence of an iron catalyst below 50° C., the chlorine is substituted in the ring member of the molecule. By following this procedure it is possible to prepare various chlorinated substitution products of toluene, such for example as mono-, di-, and trichlor toluene. The products so obtained are not chemically pure. They consist of mixtures of the various isomers and compounds of lower and higher chlorine content. The mixture of isomers of trichlor toluene is a liquid having a boiling range between 230 and 260° C. at atmospheric pressure, having a specific gravity of 1.43 at 15° C.

Isomeric mixtures of chlorinated benzyl chlorides may be prepared by direct chlorination of such isomeric mixtures of chlorinated toluene above 50° C. with a catalyst such as sulphur, or without a catalyst if so desired.

The following examples are given to illustrate various aspects of our invention, but should not be considered as limiting the scope of our invention only to such examples.

*Example I*

A liquid dielectric material which may be chemically considered as symmetrical dichlor diphenyl methane, or in other words methane in which two of the hydrogens have been replaced by two monochlor phenyl groups, may be prepared by employing monochlor benzyl chloride and monochlor benzene in the following manner:

A mixture of monochlor benzyl chloride and monochlor benzene (preferably in the ratio of 1 to 6 mols. respectively) are warmed at 25 to 30° C. for two or three hours over aluminum chloride in an amount equal to a molecular equivalent of the monochlor benzyl chloride used. The resulting mixture is purified by fractional distillation and a liquid consisting chiefly of symmetrical dichlor diphenyl methane is obtained with a boiling point ranging from 240 to 310° C. at 25 mm. pressure.

This non-sludging liquid has a pour point (solidifying temperature) of minus 43° C. and a specific gravity of 1.25 at 15° C. (referred to water at 15.5° C.). The pour point is determined in accordance with the methods employed by American Society for Testing Materials identified as Method D-97-23-T. Because of its extremely low pour point, which makes it particularly adapted for out-door use in northern climates where temperatures far below zero are encountered, this material may be employed advantageously as a cooling dielectric medium for electrical devices, such as transformers, switches, capacitors, and cables. While inflammable to some extent, this product possesses advantages over mineral oil. It is non-sludging. It has a specific gravity greater than water and hence water will rise to the top in electrical devices where it will evaporate.

Several forms of electrical devices are shown in the drawing as representative of the electrical devices in which products embodying our invention may be used.

The transformer shown in Fig. 1 comprises the usual essential electrical elements, namely a core 2 and electrical windings 3. Only one terminal is shown, namely the high tension terminal 4, the rest being hidden in the view. The core and the windings are contained in a tank 5 shown in part broken away to expose the dielectric material 6 which consists of a halogenated phenyl derivative of methane of which the composition described under Example I is a member. The tank is provided with an easily frangible diaphragm 7 at the communication of the tank with an absorber 8 which contains a charge 9 of soda lime or similar material which is capable of combining hydrogen halide or other gaseous decomposition product which may be produced in case the dielectric material 6 is subjected to the decomposing action of an electric arc.

The switch shown in Fig. 2 comprises paired contact making-and-breaking terminals 11, 12 and 13, 14 contained in a tank 15 which contains a charge 16 of halogenated phenyl derivative of methane. As the construction of terminals 17, 18 of such a switch and its actuating mechanism 19 is well understood it will not be here described.

In Fig. 3 a capacitor has been shown schematically as another form of eletrical apparatus in which compositions embodying our invention may be used as dielectric material. The casing 21 has been shown in part broken away to show the armatures or plates 22 alternate members of which are connected respectively to the terminals 23, 24. The dielectric material 25 consists of one of the halogenated phenyl derivatives embodying our invention.

Fig. 4 shows a cable joint comprising a core 27, conductors 28 and porous insulation 29, ordinarily consisting of paper, all being contained in a casing 30. Liquid halogenated dielectric composition embodying our invention is introduced into the casing through an inlet tube 31, a quantity of such material 32 being shown surrounding the solid insulating material of the cable. It soaks into the porous insulation and surrounds the conductor members of the cable.

*Example II*

When trichlor benzyl chloride prepared as above described and benzene (preferably in the ratio of 1 to 6 mols. respectively) are warmed at 25 to 30° C. over aluminum chloride (present in an amount equal to the molecular equivalent of the trichlor benzyl chloride used) for two or three hours and the resulting mixture fractionally distilled, a liquid can be obtained with a boiling range from 220 to 240° C. under 25 m. m. of mercury pressure. This liquid composition which is chiefly made up of isomers of trichlor diphenyl methane in which the three chlorine atoms are attached to one phenyl group, has a pour point of minus 28° C. and a specific gravity of 1.36 at 15° C. (referred to water at 15.5° C.).

Its electrical properties render it especially useful as a dielectric and cooling material. For example, experiments show it to have a power factor of .73% and a dielectric constant of 3.6 when tested at 1000 cycles and 100° C., while its resistivity when tested at 500 volts (direct current) and 100° C. is 34.8 x $10^{10}$ ohms cm$^3$.

This liquid product also is non-sludging and is materially less inflammable than mineral oil. It may be used as a dielectric medium in electric devices, such as transformers, capacitors, switches and the like.

*Example III*

Another form of trichlor diphenyl methane may be prepared in the following manner. Dichlor benzyl chloride and monochlor benzene preferably in the ratio of 1 to 6 mols. respectively are warmed over aluminum chloride, present in molecular equivalent amounts to the dichlor benzyl chloride used, for two or three hours at 25 to 30° C. The mixture then is fractionally distilled and a liquid is obtained with a boiling range of 220 to 260° C. under 25 m. m. mercury pressure. This liquid consisting mainly of trichlor diphenyl methane in which one phenyl group has two substituted chlorines in the ring while the other phenyl group has but one substituted chlorine in the ring, has a pour point of minus 30° C. and a specific gravity of 1.35 at 15° C. (referred to water at 15.5° C.). The pour point is determined by the tests of the American Society for Testing Materials indicated above.

This product is in general similar to the product of Example II and may be used for the same purposes.

*Example IV*

When trichlor benzyl chloride and monochlor benzene preferably in the ratio of 1 to 6 mols. respectively are warmed at 25 to 30° C. for two or three hours over aluminum chloride, present in a molecular equivalent amount of the trichlor benzyl chloride, and the resulting mixture is purified by fractional distillation, a liquid is obtained having a boiling range from 240 to 290° C. under 25 m. m. mercury pressure. This liquid consisting chiefly of unsymmetrical tetrachlor diphenyl methane in which three chlorine atoms are attached to one phenyl group while the other phenyl group has but one chlorine atom attached thereto, has a pour point of minus 8° C. and a specific gravity of 1.43 at 15° C. (referred to water at 15.5° C.).

This liquid composition, which is substantially non-inflammable and non-sludging, possesses electrical properties rendering it useful as dielectric and cooling material. For example, it has a power factor of 1.53% and dielectric constant of 3.2 when tested at 1000 cycles and 100° C. The resistivity when tested at the same temperature and 500 volts D. C. is 16.4 x $10^{10}$ ohms cm$^3$.

This product while being in general similar in its physical properties to the products of Examples II and III possesses the advantage of being non-inflammable in bulk in the usual sense.

*Example V*

A liquid which may be chemically termed symmetrical tetrachlor diphenyl methane, or, in other words, methane in which two of the hydrogens have been replaced by dichlor phenyl groups, may be prepared in the following manner. Dichlor benzyl chloride and dichlor benzene, preferably in the ratio of 1 to 6 mols. respectively, are warmed over aluminum chloride, present to a molecular equivalent of the dichlor benzyl chloride, for two or three hours at 25 to 30° C. The resulting reaction mixture is fractionally distilled and a liquid is obtained consisting mainly of symmetrical tetrachlor diphenyl methane having a boiling range of 260 to 320° C. under 25 m. m. of mercury pressure.

This composition has a pour point of minus 10° C. and a specific gravity of 1.43 at 15° C. (referred to water at 15.5° C.). This product is non-inflammable in the ordinary sense, although inflammable gases may be formed by contact of an electric arc with the material. It may be used as a dielectric in various electric devices, such as bushings, capacitors, cables, transformers, and switches.

An example of an electric bushing for which this product may be used is the terminal 4 of Fig. 1. The conductor 10 is surrounded by a casing containing a described insulating material which preferably is of semi-solid consistency.

*Example VI*

A product made by warming trichlor benzyl chloride and dichlor benzene preferably in the ratio of 1 to 6 mols. at 25 to 30° C. for two or three hours over aluminum chloride present to a molecular equivalent of the trichlor benzyl chloride has a boiling range of 260 to 320° C. under 25 m. m. mercury pressure. This product consisting chiefly of pentachlor diphenyl methane in which two of the hydrogens of the methane have been replaced by one dichlor phenyl group and one trichlor phenyl group, has a pour point of plus 17 and a specific gravity of 1.51 at 15° C. (referred to water at 15.5° C.). At 1000 cycles and 100° C. it has a dielectric constant of 3.58, while the resistivity at 100° C. and 500 volts (direct current) is 20.6 x $10^{10}$ ohms cm$^3$.

This material while being more viscous than the material of preceding examples may be used as a dielectric in many electric devices, particularly in bushings, capacitors, and cables. It is non-inflammable.

*Example VII*

A product having a pour point of plus 20° C. which may be chemically considered as symmetrical hexachlor diphenyl methane, or in other words methane in which two of the hydrogens have been replaced by two trichlor phenyl groups, may be prepared by employing trichlor benzyl chloride and trichlor benzene in the following manner.

A mixture of trichlor benzyl chloride and trichlor benzene, the latter present in a theoretical excess preferably at least in the ratio of 1 mol. to 2 mols. of the benzyl derivitive, is warmed at 25 to 30° C. for two or three hours over aluminum chloride present in a molecular equivalent of the trichlor benzyl chloride used. The reaction product is purified by fractional distillation and a viscous liquid consisting substantially of symmetrical hexachlor diphenyl methane is obtained having a boiling range from 290° to 340° C. under 25 m. m. mercury pressure. It has a density of 1.52 at 100° C. (referred to water at 15.5° C.) and a viscosity of 84 seconds Saybolt universal at 100° C.

This non-sludging composition contains a balance between the hydrogen and halogen (an equal number of hydrogen and halogen atoms within the molecules). As a result this composition is not only non-inflammable but the gases formed by an electric arc are not explosive when mixed with oxygen, being essentially hydrogen chloride. It is particularly well adapted for dielectric purposes where the fire and explosive hazards are great. This viscous liquid may be employed singly as a dielectric medium for capacitors and cables or it may be mixed with other less viscous liquids, such, for example, as trichlor benzene. Such mixtures may be employed to advantage as insulating and cooling media for transformers, capacitors, cables, switches, and the like.

The power factor and the dielectric constant were measured at 1000 cycles while the resistivity in ohms cm³ was measured at 500 volts direct current.

The power factor at 25° C. is 1.40% decreasing rapidly to .04% at 50° C. At 75° C. the power factor is about .11% at 100° C. it is about .21%. At 25° C. the value of the dielectric constant is 4.4 while at 100° C. the dielectric constant is about 4. At 25° C. the resistivity is extremely high, the value being 2060.0 x 10¹² ohms per cm³, when tested at 500 volts, direct current. When the temperature is raised the resistivity while being decreased still remains high, the value at 50° C. being 16.2 x 10¹², and 100° C. being 94.5 x 10¹⁰ ohms per cm³.

The previous examples have dealt with compounds involving diphenyl alkyl derivatives. The next following examples will deal with triphenyl alkyl derivatives.

Triphenyl methane may be prepared by the Friedel-Craft reaction by condensing benzal chloride ($C_6H_5.CHCl_2$) with benzene in the presence of aluminum chloride. The various chlorinated triphenyl methane derivatives also may be prepared by the Friedel-Craft reaction by condensing chlorinated benzal chloride with benzene or benzal chloride with chlorinated benzene in the presence of aluminum chloride.

The benzal chloride, or its chlorinated derivatives, (which may be represented as

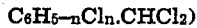

$C_6H_{5-n}Cl_n.CHCl_2$)

may be prepared in a manner similar to the preparation of benzyl chloride, or its chlorinated derivatives. The two aliphatic chlorine atoms in benzal chloride are substituted in the side chain of toluene or chlorinated toluene by direct chlorination above 50° C.

Example VIII

A liquid composition consisting substantially of trichlor triphenyl methane in which three of the hydrogens of the methane have been replaced by three phenyl groups one of the phenyl groups containing three substituted chlorine atoms in the ring, may be prepared by employing trichlor benzal chloride and benzene in the following manner.

A mixture of trichlor benzal chloride and a molecular excess of benzene preferably in the ratio of 1 molecule of trichlor benzal chloride to at least 6 mols. of benzene are warmed at 25 to 30° C. for two or three hours with aluminum chloride present to a molecular equivalent of twice that of the benzal derivative used. The resulting mixture is fractionally distilled and a liquid consisting chiefly of trichlor triphenyl methane is obtained with a boiling range from 230 to 260° C. under 25 m. m. mercury. It has a pour point of minus 14° C. and a specific gravity of 1.30 at 15° C. (referred to water at 15.5° C.).

The electrical properties of this composition show that it is well adapted for dielectric material. At 50° C. and 1000 cycles the power factor is .106% and the dielectric constant 3.64, while at 100° C. under similar conditions the power factor is .61% and the dielectric constant 3.46. The resistivity when tested at 500 volts D. C. and 50° C. was found to be 220. x 10¹⁰ ohms cm³, while at 100° C. under similar conditions the value was found to be 36. x 10¹⁰ ohms cm³.

This material while not being definitely non-inflammable may be used to advantage in place of mineral oil in electrical devices.

Example IX

Dichlor benzal chloride and a molecular excess of monochlor benzene preferably in the ratio of 1 mol. dichlor benzal chloride to at least 6 mols. of monochlor benzene may be condensed in the presence of aluminum chloride present to a molecular equivalent of twice that of the dichlor benzal chloride by warming for two or three hours at 25 to 30° C. The reaction mixture is subjected to fractional distillation. A semi-viscous liquid is obtained having a boiling range of 280 to 320° C. under 25 m. m. of mercury. This liquid consists chiefly of tetrachlor triphenyl methane in which three of the hydrogen atoms of the methane have been replaced by one dichlor and two monochlor phenyl groups.

This product may be used advantageously in various forms of electric devices, such as cables, bushings, and capacitors, in which low viscosity of the dielectric material is not required.

Example X

A viscous liquid material which may be chemically considered as pentachlor triphenyl methane, in which three of the hydrogens of the methane have been replaced by one trichlor and two monochlor phenyl groups, may be prepared in the following manner:

A mixture of trichlor benzal chloride and a molecular excess of monochlor benzene preferably in the ratio of 1 mol. of trichlor benzal chloride to at least 6 mols. of monochlor benzene is warmed with aluminum chloride present to a molecular equivalent of twice the trichlor benzal chloride used at 25 to 30° C. for two or three hours. The resulting mixture is fractionally distilled and a liquid is obtained having a pour point of plus 30° C. and a boiling range of 280 to 320° C. under 25 m. m. mercury pressure.

This liquid consisting substantially of pentachlor triphenyl methane has a density of 1.32 at 100° C. referred to water at 15.5° C. Its dielectric constant at 1000 cycles and 50° C. is 4.04, while under the same conditions and 100° C. it is 3.86. Its power factor at 50° C. and 1000 cycles is .159%. Its resistivity at the same temperature and 500 volts (direct current) is 72.1 x 10¹⁰ ohms cm³.

This product is non-inflammable although there is an excess of hydrogen in the molecule. It can be used to advantage in capacitors, junction boxes, bushings and other electric devices in which high viscosity is not a disadvantage.

It will be understood by those skilled in the art that the temperature range of the reactions and proportions of ingredients employed, as set out in the examples, may be varied without departing from the spirit of our invention.

In Fig. 5 of the drawing, graphs A and B show the relation of the power factor (A) and the dielectric constant (B) respectively to the chlorine content of chlorinated diphenyl methane within the range of about 40% chlorine content to 57% chlorine content, the values being taken at 100° C. at 1000 cycles.

The product containing 57 per cent chlorine by weight, which corresponds to the hexachlor derivative (Example VII) possesses a fortuitous combination of electrical and physical properties which make it particularly adapted for dielectric material. It has a low power factor and a high dielectric constant. This composition is not only non-inflammable but as it contains an equimolecular hydrogen-halogen balance the gases formed by an electric arc are non-explosive.

While our invention has been described with particular reference to use in electrical devices of a dielectric composed of various chlorinated polyphenyl derivatives of methane, we may employ to advantage mixtures of the several compositions which have been described in the aforementioned examples. Mixtures of the underchlorinated compositions (compositions containing less chlorine than hydrogen) may be mixed with over-chlorinated compositions (compositions containing more halogen than hydrogen) in order to obtain a mixture with the hydrogen-halogen balance. Such mixtures, as has been pointed out, are not only non-inflammable but the gases formed by an arc are non-explosive.

Dielectric mixtures comprising halogenated polyphenyl methane with other halogenated derivatives, such, for example, as trichlor benzene, chlorinated diphenyl, or the like, are meant to be included and come within the scope of our invention.

Mixtures of halogenated polyphenyls, such for example as chlorinated diphenyl or chlorinated polyphenyl methane, with various mineral or vegetable oils have been described and claimed in a copending application Serial No. 656,142, filed February 10, 1933.

In our copending application Serial No. 664,359 filed April 4, 1933 we have described and claimed phenyl derivatives of ethane, these also being examples of phenyl derivatives of an alkyl group, within the broad confines of our invention. For example, a mixture of four mols. of ethylene dichloride and one mol. of trichlor benzene is caused to react in the presence of aluminum chloride by heating to about 50 to 60° C. and separating from the reaction product by distillation a viscous liquid consisting essentially of symmetrical hexachlor dibenzyl. Such product by itself or in combination with trichlorbenzene may be employed as a dielectric medium in various electric devices, such as transformers, switches and the like.

In another copending application Serial No. 664,360 filed April 4, 1933, we have described and claimed another class of compounds in which phenyl groups are linked by carbon. It may be considered as phenyl derivatives of a ketone. For example, one mol. of benzene and two mols. of carbon tetrachloride may be caused to react in the presence of aluminum chloride to form diphenyl dichlor methane which is hydrolyzed to form diphenyl ketone which then may be halogenated at 150 to 160° C. in the presence of iron, or iron chloride.

In a generic sense all of the above compounds may be classed as halogenated hydrocarbons containing aromatic nuclei or groups linked together by one or more carbon nuclei or groups, the halogen atoms being attached to one or more aromatic nuclei.

What we claim as new and desire to secure by Letters Patent of the United States is:

1. In a composition of matter, a non-crystalline, halogenated compound containing phenyl groups linked to a methane group, the halogen atoms being attached to the phenyl groups.

2. A range of liquid chlorinated polyphenyl methane products having pour points not substantially higher than plus 30° C. and as low as minus 43° C.

3. In a composition of matter, a non-crystalline hexachlor diphenyl methane.

4. In a composition of matter, a range of non-crystalline chlorine derivatives of diphenyl methane having a chlorine content of 40 to 57% and being characterized as a dielectric material by low electrical power factor, high dielectric constant and high resistivity.

5. A composition of matter comprising essentially chlorinated diphenyl methane containing about 57 per cent chlorine by weight, said compound evolving substantially only non-combustible gas when decomposed by contact with an electric arc.

6. The process which consists in heating to a reaction temperature a mixture of a phenyl substitution product of a halogenated alkyl compound and halogenated benzene in the presence of a condensation agent and isolating from the products of the resulting reaction a resulting halogenated condensation product containing alkyl and phenyl groups.

7. The process which consists in heating to a reaction temperature in the presence of aluminum chloride a mixture of phenyl substitution product of a halogenated alkyl compound and a molecular excess of halogenated benzene compound thereby forming a halogenated diphenyl methane and isolating the latter from the other products of such reaction.

8. The process which consists in heating to a reaction temperature in the presence of a condensation agent a phenyl substitution product of a halogenated alkyl compound and a molecular excess of a halogenated benzene compound and isolating from the products of the resulting reaction a non-crystalline halogenated phenyl condensation product.

9. The process which consists in heating to a reaction temperature in the presence of a condensation agent trichlor benzyl chloride and a molecular excess of trichlor benzene, and separating from the products of the resulting reaction liquid hexachlor diphenyl methane.

10. The process which consists in heating to a reaction temperature in the presence of a condensation agent chlorinated benzyl chloride and a molecular excess of chlorinated benzene and separating from the products of the resulting reaction a liquid chlorinated diphenyl methane product.

11. The process which consists in heating in the presence of aluminum chloride to a temperature of about 25 to 30° C. for about two to three hours trichlor benzyl chloride and a molecular excess of trichlor benzene and removing by fractional distillation from the products of such reaction a viscous liquid comprising in major part hexachlor diphenyl methane.

12. The process which consists in heating to a reaction temperature in the presence of a condensation agent chlorinated benzal chloride and a molecular excess of a chlorinated benzene and separating chlorinated triphenyl methane from the products of the resulting reaction.

13. The process which consists in heating to a reaction temperature in the presence of a condensation agent chlorinated benzal chloride and a molecular excess of monochlor benzene and separating chlorinated triphenyl methane from the products of the resulting reaction.

14. In a composition of matter, a non-crystalline compound having the following formula:

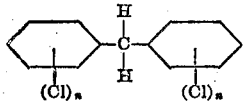

where $n$ may be 1, 2 or 3.

15. In a dielectric material, a reaction product formed by condensation of a phenyl substitution product of a halogenated methane compound with a halogenated benzene compound, said products having high electrical resistance, good dielectric properties, being non-crystalline, non-inflammable and having a range of pour points varying from about —43 to 30° C.

16. In a dielectric material, a viscous liquid compound containing phenyl groups linked to a methane group having a chlorine content within the limits of about 40 to 57 per cent, being non-inflammable and evolving only non-inflammable gases when decomposed by an electric arc.

FRANK M. CLARK.
WALTER M. KUTZ.